(No Model.) 2 Sheets—Sheet 2.

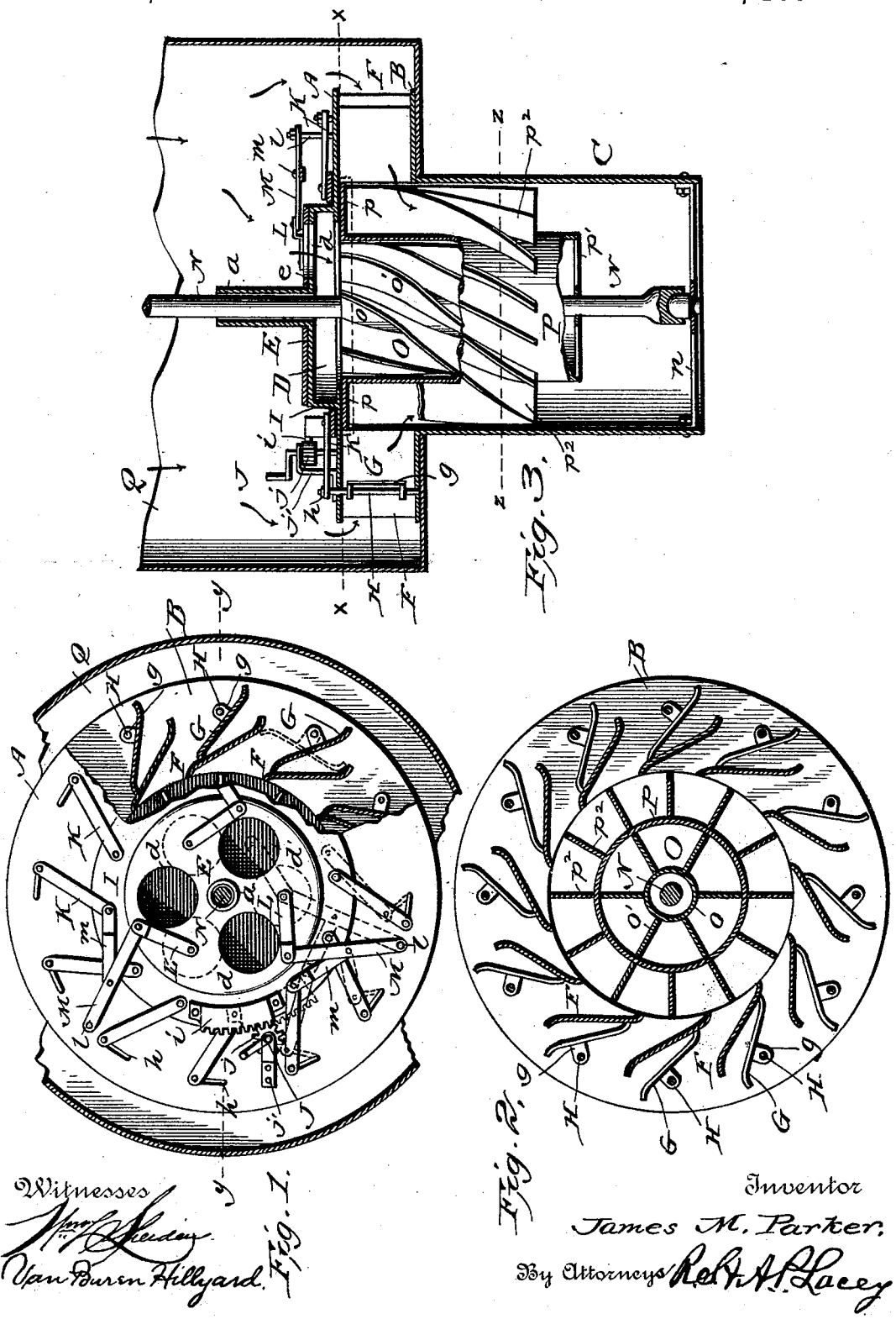

J. M. PARKER.
TURBINE WATER WHEEL.

No. 521,386. Patented June 12, 1894.

Witnesses

Inventor
James M. Parker.
By Attorneys

UNITED STATES PATENT OFFICE.

JAMES MONROE PARKER, OF McADENSVILLE, NORTH CAROLINA.

TURBINE WATER-WHEEL.

SPECIFICATION forming part of Letters Patent No. 521,386, dated June 12, 1894.

Application filed July 6, 1893. Serial No. 479,732. (No model.)

*To all whom it may concern:*

Be it known that I, JAMES MONROE PARKER, a citizen of the United States, residing at McAdensville, in the county of Gaston, State of North Carolina, have invented certain new and useful Improvements in Turbine Water-Wheels; and I do hereby declare the following to be a full, clear, and exact description of the invention, such as will enable others skilled in the art to which it appertains to make and use the same.

This invention relates to turbine water wheels, and aims to provide two separate and independent concentric turbine wheels mounted on the same shaft, each turbine wheel having an independent supply of water for operating the same, and having one flume common to both turbine wheels.

A further purpose of the invention is to obtain an increased power from a given head of water and a wheel of certain size, and provide simple and efficient means for regulating the supply of water to the independent turbine wheels by a single operation.

The invention consists of the novel features and the peculiar construction and combination of the parts which will be hereinafter more fully described and claimed and which are shown in the annexed drawings, in which—

Figure 6:
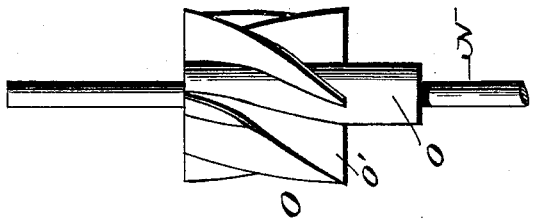
Figure 5:
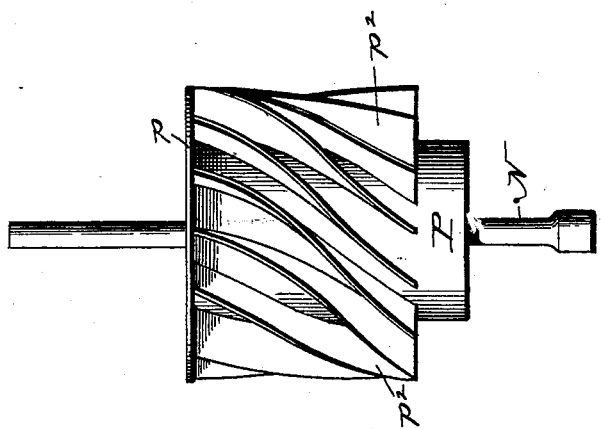
Figure 4:
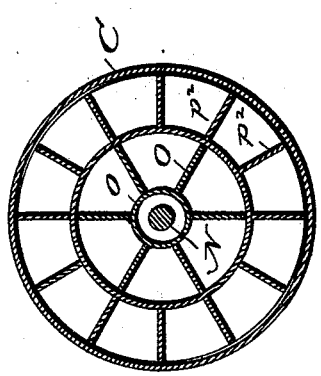

Figure 1 is a top plan view of a turbine water wheel embodying my invention, showing the operation of the mechanism for controlling the supply of water by dotted lines, parts being broken away to show the lateral chutes and gates. Fig. 2 is a horizontal section on the line X—X of Fig. 3. Fig. 3 is a vertical section about on the line Y—Y of Fig. 1. Fig. 4 is a horizontal section on the line Z—Z of Fig. 3. Fig. 5 is a detail view of the outer wheel. Fig. 6 is a detail view of the inner turbine wheel.

The curb or casing is composed of upper and lower plates A and B, respectively, and a tubular portion C depending from the lower plate B. The lower plate B is preferably an annulus and is attached at its inner edge to the tubular portion C in any desired manner to obtain a close joint. The upper plate A is centrally apertured and provided with a raised portion D which is provided with a series of openings $d$ to admit the water to the inner turbine wheel. A gate E is mounted on the raised portion D and is provided with openings $e$ corresponding in position and number with the openings $a$. This gate E is constructed to close the openings $e$ and shut off the supply of water to the inner turbine wheel when turned to the proper position. A series of chutes F is located in the space between the upper and lower plates A and B and are properly spaced apart to form water ways for the passage of the water to the outer turbine wheel. These chutes F are preferably of ogee shape and obliquely disposed, this construction and arrangement being found to give the best results.

Gates G are provided to control the water ways formed between the chutes F and are mounted upon vertical shafts H which are journaled in the upper and lower plates A and B, and which have their upper ends projected above the plate A and provided with cranks $h$ by means of which the said gates are operated to control the supply of water. The gates G are preferably of ogee shape and have a strip $g$ attached to the outer side thereof, the ends of the said strip $g$ being bent at right angles to form arms which are secured to the vertical shafts H. A ring I surrounding the raised portion D is provided with a segment rack $i$ which is in gear with a pinion $j$ mounted on a crank J which is journaled in the upper plate A and bracket $j'$ secured to the said plate A. A series of links K is pivotally attached at their inner ends to the ring I and at their outer ends to the cranks $h$ for the purpose of simultaneously operating all of the gates G on turning the ring I, which latter operation is effected by means of the crank J, pinion $j$, and rack $i$ as will be readily understood. Toggle levers L and M are pivotally connected to the gate E and to studs $l$ projected vertically from the plate A. Links $m$ are pivotally connected with the ring I, and with the outer toggle levers M for the purpose of operating the gate E when turning the ring I, thereby simultaneously regulating the flow of water to the inner and outer turbine wheels.

The shaft N is journaled at its lower end on a fork projected vertically from a spider or cross bar $n$ at the lower end of the tubular portion C, and is journaled near its upper end in a tubular bearing $a$ attached to the raised portion D. The inner turbine wheel O is attached directly to the shaft N and is composed of a tubular portion $o$, and a series of blades or wings $o'$ spirally disposed on the tubular portion $o$. A cylindrical case P surrounds the inner turbine wheel and is provided at its upper end with an outwardly extending flange $p$, and at its lower end with a spider $p'$ by means of which it is braced from the shaft N. A series of blades or wings $p^2$ is spirally arranged and secured on the cylindrical casing P, and with the latter form the outer turbine wheel. The cylindrical case P serves to separate the inner from the outer turbine wheel and prevents the mingling of the waters admitted to the gates G E, respectively.

The flume Q is represented in Fig. 3, and the water wheel is arranged in the lower end thereof, being supported by the lower plate B which surrounds the opening through which the tubular portion C projects. On operating the ring I the gates E and G are opened and the water is admitted to the inner and outer turbine wheels, which latter are set in motion and rotate the shaft N from which the power is taken in any well known manner. By properly manipulating the ring I the gates E and G can be opened the required distance to obtain the desired power, or be closed when it is not desired to have the water wheel in operation.

Having thus described my invention, what I claim, and desire to secure by Letters Patent, is—

1. In a turbine wheel having two concentrically disposed water wheels, the combination of a case having top and side ports to admit water, respectively, to the inner and the outer wheels, gates for controlling the water through the said ports, a rotatable ring I, links K connecting the side gates with the said ring, toggle levers L and M connected, respectively, with the case and the top gate, and links $m$ connecting the ring I with the said levers M, substantially as described.

2. The herein described water motor consisting of, a case comprising the upper plate A having a centrally raised portion D, the lower plate B and the tubular portion C depending from the lower plate B, chutes F arranged between the upper and lower plates, gates G for controlling the passage ways formed between the said chutes, a gate E for controlling the flow of water through openings provided in the raised portion D, a ring I encircling the raised portion D, links connecting the said ring with crank arms attached to the gates G, toggle levers L and M connected at their ends, respectively, with the plate A and the gate E, links $m$ connecting the toggle levers M with the ring I, means for turning the said ring, and an inner and an outer turbine wheel mounted on the same shaft and separated by a cylindrical case, substantially as and for the purpose specified.

In testimony whereof I affix my signature in presence of two witnesses.

JAMES MONROE PARKER.

Witnesses:
JNO. F. LOVE,
J. E. PAGE.